United States Patent [19]

Sparks

[11] 4,391,225

[45] Jul. 5, 1983

[54] SPRINGLESS NIPPLE WATERER VALVE

[76] Inventor: Jacob D. Sparks, 1005 W. Third, Indianola, Iowa 50125

[21] Appl. No.: 350,052

[22] Filed: Feb. 18, 1982

[51] Int. Cl.³ .............................................. A01K 7/00
[52] U.S. Cl. .................................... 119/72.5; 119/75; 251/298
[58] Field of Search ................. 119/75, 72.5; 251/303, 251/298

[56] References Cited

U.S. PATENT DOCUMENTS

| | | | |
|---|---|---|---|
| 2,598,417 | 5/1952 | Niemann | 251/303 |
| 3,128,745 | 4/1964 | Alter | 119/75 |
| 3,698,685 | 10/1972 | Lang | 119/72.5 |

FOREIGN PATENT DOCUMENTS

| | | | |
|---|---|---|---|
| 1907945 | 10/1970 | Fed. Rep. of Germany | 119/75 |
| 1332134 | 10/1973 | United Kingdom | 119/72.5 |
| 694154 | 10/1979 | U.S.S.R. | 119/75 |

Primary Examiner—Jay N. Eskovitz
Attorney, Agent, or Firm—G. Brian Pingel

[57] ABSTRACT

A springless nipple waterer valve includes a valve body in which a valve member is positioned with a valve head in bearing engagement with the apex portion of an abutment member at one end of the valve body. A valve seat is located in the valve body and the valve member has a valve head. A resilient sealing member is positioned between the valve head and the valve seat so that the bearing engagement of the abutment member with the valve member normally prevents fluid flow through the valve. However, the valve member is actuable by an animal pressing thereon to pivot the valve head about the apex portion of the abutment member, thereby permitting fluid flow through the valve. To vary the amount of flow through the valve, the valve member is adjustable to provide high or low rates of flow.

4 Claims, 5 Drawing Figures

U.S. Patent   Jul. 5, 1983   4,391,225
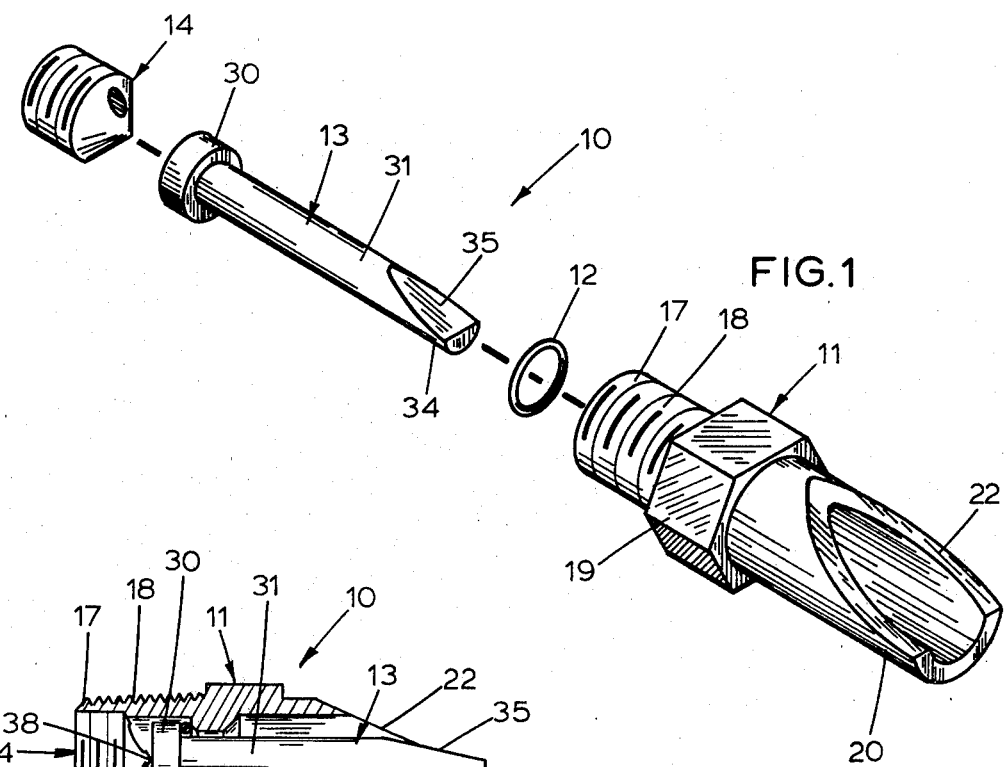
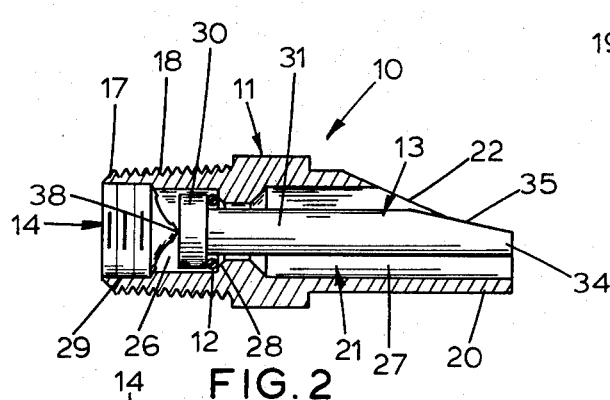
FIG. 2
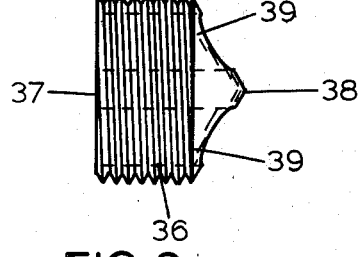
FIG. 3
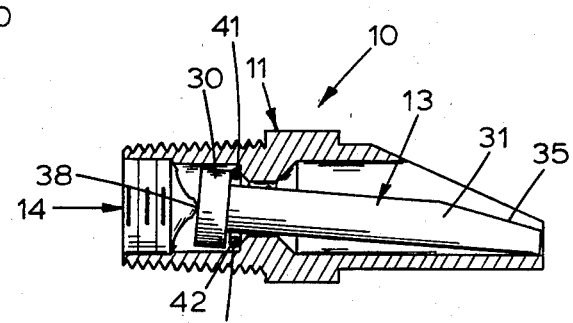
FIG. 4
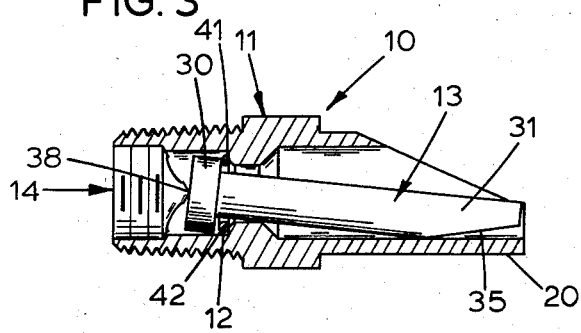
FIG. 5

SPRINGLESS NIPPLE WATERER VALVE

BACKGROUND OF THE INVENTION

1. Field of the Invention

The present invention relates to nipple waterer valves that are actuable by pressure applied on the valve by an animal to provide fluids thereto and more specifically relates to such valves that do not include spring biasing elements.

2. Description of the Prior Art

Nipple waterer valves for animals are commonly used in animal feeding to provide a clean and efficient method for supplying animals with drinking water. The majority of nipple waterers presently on the market include valves having spring biasing members to normally maintain the valve in a shut-off condition. However, such valves have not proved advantageous in use as they have a relatively high incidence of maintenance problems. As a result, there has been a strong need for nipple waterers that operate without the use of springs.

One type of nipple waterer valve presently on the market that has achieved the above objective is provided by Edstrom Industries, Inc., listed as Part No. 10743. The Edstrom valve instead of having a spring has a diaphragm interposed between a retainer screw portion and the head of a valve member. The diaphragm is resilient so that when an animal exerts pressure on the valve member, the valve member head is movable to permit fluid flow between the head and an o-ring sealing member. Although the Edstrom valve has no springs, it too has proved deficient for long-term use under extreme conditions because the diaphragm that is the heart of the Edstrom valve has orifices to permit water therethrough. These orifices have proved to be extremely troublesome because they are frequently blocked by contaminants in the water and therefore frequent cleaning of the valves is required.

The present invention provides a springless nipple waterer valve that is not only simple in construction, but operates efficiently and effectively for long-term usage with little maintenance.

SUMMARY OF THE INVENTION

The present invention provides a springless nipple waterer valve for feeding livestock that includes a valve body with a longitudinal passageway having a valve seat, a valve member located in the valve body, an abutment member that bears against the valve member to normally bias the member against a sealing member which in turn bears against the valve seat to prevent fluid flow through the valve.

The valve body has a threaded end for attachment to a source of fluid, and an opposite end with a cut away section to expose a portion of the longitudinal passageway. The valve member is positioned in the valve body passageway and includes a valve head and an elongated valve stem that extends through the valve seat and has a free end that projects into the exposed portion of the valve body passageway.

The abutment member is threadable into the threaded end of the valve body passageway and comprises at least one fluid conducting throughbore and an end that is apex shaped and is in bearing engagement with the head of the valve member to normally bias it in sealing contact against the sealing member to normally prevent fluid flow through the valve but permit the valve to point about the abutment member apex. Under normal operating conditions, the valve is actuated by an animal pressing on the free end of the valve stem to pivot the valve head from sealing contact with the seal member to thereby permit fluid flow through the valve. When the animal releases pressure on the valve, the valve head is returned to its normal sealing contact against the seal member to again prevent fluid flow through the valve.

Thus, the present invention provides a nipple waterer valve that does not depend upon the action of coil spring-type devices for its operation and yet is more effective and efficient than waterer valves that include spring-type elements.

BRIEF DESCRIPTION OF THE DRAWINGS

FIG. 1 is an exploded perspective view of the waterer valve of the present invention that includes a valve body, an o-ring sealing member, a valve member, and an abutment member;

FIG. 2 is a longitudinal cross section view of the valve of FIG. 1 in a fully assembled condition;

FIG. 3 is a side view of the abutment member shown in FIGS. 1 and 2;

FIG. 4 is a cross section view similar to that of FIG. 2, but showing the valve member in a first actuated condition for providing fluid flow through the valve; and FIG. 5 is a cross section view similar to that of FIG. 4, but with the valve member rotated 180 degrees.

DESCRIPTION OF THE PREFERRED EMBODIMENT

Referring now to the drawings and with reference first to FIG. 1, a preferred embodiment of the springless nipple waterer valve of the present invention is shown at 10. The valve 10 is designed to provide a means for watering all types of livestock in an effective and efficient manner through actuation of the valve by the animals actually using it. It is contemplated that the valve 10 will have particularly advantageous application not only for baby pigs but also hogs in all stages of growth.

The valve 10 is formed of a relatively simplistic construction that includes a valve body 11, an o-ring type seal member 12, a valve member 13 and an abutment member 14. Referring now to both FIGS. 1 and 2, the valve body 11 includes a coupling end 17 having a threaded exterior circumference 18 for ready connection to a water supply line (not shown). Formed adjacent the coupling end 17 approximately medially of the valve body 11 is a hexagonally shaped flange portion 19 for providing tool gripping surfaces to facilitate installation or removal of the valve 10. A discharge end in the valve body 11 is formed at 20. As indicated most clearly in FIG. 2, the valve body 11 has a longitudinally directed passageway 21 through which water flows from the coupling end 17 to the discharge end 20. A portion of the discharge end 20 is cut away on an incline at 22 to expose a segment of the interior of the passageway 21. The passageway 21 has an inlet end 26 and an outlet end 27 of substantially similar diameters but is reduced in size approximately medially of the valve body 11 to provide a valve seat 28. Also, the inlet end 26 of the passageway 21 is threaded at 29.

Referring again to both FIGS. 1 and 2, the valve member 13 is formed with a cylindrically shaped valve head 30 at one end and an elongated valve stem 31 extended outwardly from the valve head 30 and having an axis coincident with that of the valve head 30. The valve stem 31 has a free end 34 that is cut on an inclined slant at 35 similar somewhat to the cut away slanted portion 22 of the valve body discharge end 20. Thus, when the valve member 13 is positioned inside the passageway 21 of the valve body 11, as shown in FIG. 2, the valve stem end 34 is exposed to view, and the valve member head 30 contacts the seal member 12, which in turn bears against the valve seat 28.

To maintain the valve member 13 in proper location inside the valve body passageway 21, the abutment member 14 is threadibly received inside the passageway 21. As shown most clearly in FIG. 3, the abutment member 14 is primarily cylindrically shaped with exterior threads 36 about its circumference. One end 37 of the member 14 is substantially flat whereas the opposite end 38 is shaped in the form of a cone having a pointed apex. Preferably, the abutment member 14 has two longitudinally directed throughbores 39 for permitting fluid flow into the interior of the passageway 21. However, it is not essential that two throughbores 39 be employed and instead, the member 14 may have a few as one throughbore or a large plurality of such throughbores.

As best shown in FIG. 2, the abutment member 14 is threadibly inserted inside the valve member passageway 21 so that it's apex end 38 abutts against the valve member head 30. To provide for the greatest amount of fluid flow through the valve 11, the member 14 is inserted sufficiently to engage the valve head 30 and force it into sealing contact with the seal member 12, which in turn is directed against the valve seat 28 in sealing contact. Preferably, the abutment member 14 should not be inserted beyond this point, because as the member 14 is moved inwardly, the seal member 12 will be further compressed and in fact can be compressed to such a point that the valve member 11 will become inoperable, as will now be described with reference to FIGS. 4 and 5.

The valve 10 is designed to be actuated by the pressure applied by an animal pressing on the valve stem 31. As shown in FIG. 4, the resiliency of the seal member 12 and the apex portion 38 of the abutment member 14 permit the valve head 30 to pivot from its normal position about the apex portion 38. In this way, a portion 41 of the member 12 is further compressed between the valve head 30 and the valve seat 28 whereby a seal member portion 42 becomes uncompressed to provide a fluid flow path between the seal member portion 42, the valve head 30 and the valve seat 28. Thus, so long as pressure is applied by the animal upon the valve stem 31, fluid will flow through the device 10. However, once such pressure is released, resiliency of the seal member portion 41 will urge the valve head to return its normal position thereby again providing sealing contact about the total circumference of the seal member 12.

A particular advantage of the present invention is that fluid flow through the valve 10 can be adjusted without removal of the valve 10 from its coupling connection with an associated supply line. This adjustment is provided by the cut away end portion 35 of the valve stem 31 as shown in FIG. 5. The adjustment is made by simply rotating the valve member 180 degrees so that the cut away portion 35 faces the un-cut portion of the discharge end 20. Thus, when pressure is applied on the valve stem 31, a greater pivoting action of the valve member 13 may occur to thus accentuate the water flow passage between the sealing member 12, the valve head 30 and the valve seat 28.

Thus, the present invention provides a nipple waterer valve that in no way relys upon a spring-type biasing action for its operation. Instead, the entire biasing forces involved in the member 10 are provided simply by the o-ring 12. Also, the valve 10 is adapted to provide high and low rates of fluid flow simply by an adjustment that may be made without removal of the valve 10 from its installation. As a result, the valve 10 is highly efficient and effective for providing an automatic watering system for livestock.

I claim:

1. A springless nipple waterer valve that is actuable by an animal to provide fluids thereto, comprising:
    (a) A valve body having
        (1) one end having means for attaching said valve to a source of fluid supply;
        (2) a fluid conducting passageway;
        (3) a valve seat located in said passageway; and
        (4) an opposite end having a cut away portion to expose a portion of said passageway;
    (b) a valve member positioned in said passageway and having a valve head and valve stem that extends through said valve seat and has a free end that projects into said exposed portion of said passageway;
    (c) a resilient seal member positioned between said valve head and said valve seat;
    (d) an abutment member secured in said one end of said passageway and having at least one fluid conducting throughbore and a cone shaped apex end in engagement with the head of said valve member to normally bias said head in sealing contact against said sealing member preventing fluid flow through said valve but permitting said valve head to pivot about said apex;
    (e) said valve being actuable by an animal pressing on the free end of said valve stem to pivot said valve head from sealing contact with said sealing member by compressing a portion of said seal member, to thereby permit fluid flow through said valve.

2. A springless nipple waterer valve as recited in claim 1 wherein:
    (a) one end of said fluid conducting passageway has threads; and
    (b) said abutment member is threadably secured in said one end of said passageway.

3. A springless nipple waterer valve as recited in claim 1 wherein the free end of said valve member stem has a cut away portion and said valve member is rotatable between a first position wherein said cut away portion of said stem is adjacent said cut away portion of said valve body and a second position wherein said valve member is rotated 180 degrees from said first position.

4. A springless nipple waterer valve as recited in claim 1 wherein:
    (a) said valve seat is positioned approximately at middle of said valve body; and
    (b) said valve stem is elongated.

* * * * *